United States Patent [19]
Garrigues et al.

[11] Patent Number: 6,073,650
[45] Date of Patent: Jun. 13, 2000

[54] VALVE WITH ACTUATOR WHOSE FUNCTIONAL CAPABILITY CAN BE MONITORED

[75] Inventors: Jean-Claude Garrigues, Cadaujac; Hubert Ferragne, Bordeaux; Dominique Duboy, Gradignan, all of France

[73] Assignee: KSB S.A., Grennevilliers, France

[21] Appl. No.: 09/027,011

[22] Filed: Feb. 20, 1998

[30] Foreign Application Priority Data

Feb. 21, 1997 [FR] France ................................. 97 02087

[51] Int. Cl.⁷ .................................................. F16K 37/00
[52] U.S. Cl. .......................... 137/552; 137/557; 73/168
[58] Field of Search .................................. 137/552, 554, 137/557; 73/168

[56] References Cited

U.S. PATENT DOCUMENTS

| | | | |
|---|---|---|---|
| 4,211,263 | 7/1980 | Kennedy et al. | 141/83 |
| 4,542,649 | 9/1985 | Charbonneau et al. | 73/168 |
| 4,694,390 | 9/1987 | Lee | 137/554 X |
| 4,735,101 | 4/1988 | Charbonneau et al. | 137/552 X |
| 4,759,224 | 7/1988 | Charbonneau et al. | 73/168 X |
| 5,329,956 | 7/1994 | Marriott et al. | 137/552 X |
| 5,425,270 | 6/1995 | McDonald et al. | 137/552 X |
| 5,469,737 | 11/1995 | Smith et al. | 137/552 X |
| 5,538,036 | 7/1996 | Bergamini et al. | 137/552 |
| 5,819,783 | 10/1998 | Blatt et al. | 137/552 |

FOREIGN PATENT DOCUMENTS 0 629 804  of 1994  European Pat. Off. .

*Primary Examiner*—John Rivell
*Attorney, Agent, or Firm*—Knobbe, Martens, Olson & Bear, LLP

[57] ABSTRACT

Valve with an actuator which consumes power from an energy source and which comprises a device capable of detecting that the actuator is operating the valve, a first sensor for measuring a value representative of the power consumption from the energy source and an electronic circuit connected to the first sensor and to the device so as to compare the value representing the power consumption from the energy source with a reference value, during operation of the valve by the actuator, and provide information on the basis of this comparison.

13 Claims, 2 Drawing Sheets

VALVE WITH ACTUATOR WHOSE FUNCTIONAL CAPABILITY CAN BE MONITORED

FIELD OF THE INVENTION

The invention relates to valves and, more particularly, to valves comprising an actuator supplied by an energy source. This energy source may be an electrical source, but also, in particular, a source supplying a pressurised fluid, notably compressed air.

BACKGROUND OF THE INVENTION

A valve with an actuator of this kind is already known, comprising a device capable of detecting that the actuator is operating the valve. This device may consist of electrical limit contacts or a potentiometer which determines the position of the valve.

A valve of this kind has the following drawbacks. If the energy source is defective and is incapable of supplying the power required, the actuator will not be in a position to operate the valve. In numerous installations in which the valve has a safety function and must operate without fail at a given moment, one would wish to be certain that at that instant the energy source is capable of supplying the necessary power and consequently would want to be able to check in advance that it is indeed capable of operation and to be warned if it is not. Nor is there any warning as to the condition of the valve or its degree of wear. If a foreign body is obstructing the operation of the valve, there is no way of knowing this either.

SUMMARY OF THE INVENTION

The invention overcomes these disadvantages with a valve having an actuator supplied by an energy source and comprising a device capable of detecting whether the actuator is operating the valve. According to the invention, a first sensor is provided for measuring a value representative of the power consumption from the energy source and an electronic circuit connected to the first sensor and to the device so as to compare the value representing the power consumption from the energy source with a reference value, during the operation of the valve by the actuator, and to provide information based on this comparison.

If, during operation of the valve by the actuator, the electronic circuit confirms that the actual power consumption from the energy source is greater than a first reference value, seeming to indicate that there is an obstacle preventing the operation, or is less than a second reference value, seeming to indicate that the valve is excessively worn, the electronic circuit provides information. The operator is warned that the valve needs attention.

According to one feature, which gives results by itself, the valve to be operated may comprise a second sensor (referred to as the second sensor only to distinguish it from the first, if there is a first sensor) for measuring a value representative of the power capable of being supplied to the actuator by the energy source, the electronic circuit being connected to the second sensor and to the device so as to compare the value representing the power capable of being supplied to the actuator by the energy source with a reference value, when the valve is not being operated by the actuator, and to provide information based on this comparison.

When the actuator is not operating the valve, the sensor measures the ability of the source to supply a sufficient level of power. If this power is below the set value, the electronic circuit indicates this, e.g. by means of an alarm.

The word "information" here means a signal which raises the alarm, causing shutdown or providing data as to status or digital data relating to the valve. The signal may be visual, audible or electrical.

According to one embodiment, the energy source supplies a pressurised fluid, the actuator comprises a pneumatic jack piston and the first sensor measures the fluid pressure at either end of the pneumatic jack piston. The second sensor measures the fluid pressure arriving at the actuator upstream of the pneumatic jack piston.

According to another embodiment, the energy source supplies electric current, the actuator is an electromechanical transducer and the first sensor measures the consumption of electrical power from the energy source during operation of the valve. The second sensor measures the electrical voltage applied to the actuator by the energy source.

If desired, action may be taken immediately on the strength of the information given by the electronic circuit, but it is also possible to store it in order to have a history of the operation of the valve.

BRIEF DESCRIPTION OF THE DRAWINGS

In the accompanying drawings, which are provided solely by way of example.

DETAILED DESCRIPTION OF THE INVENTION

Figure 1:
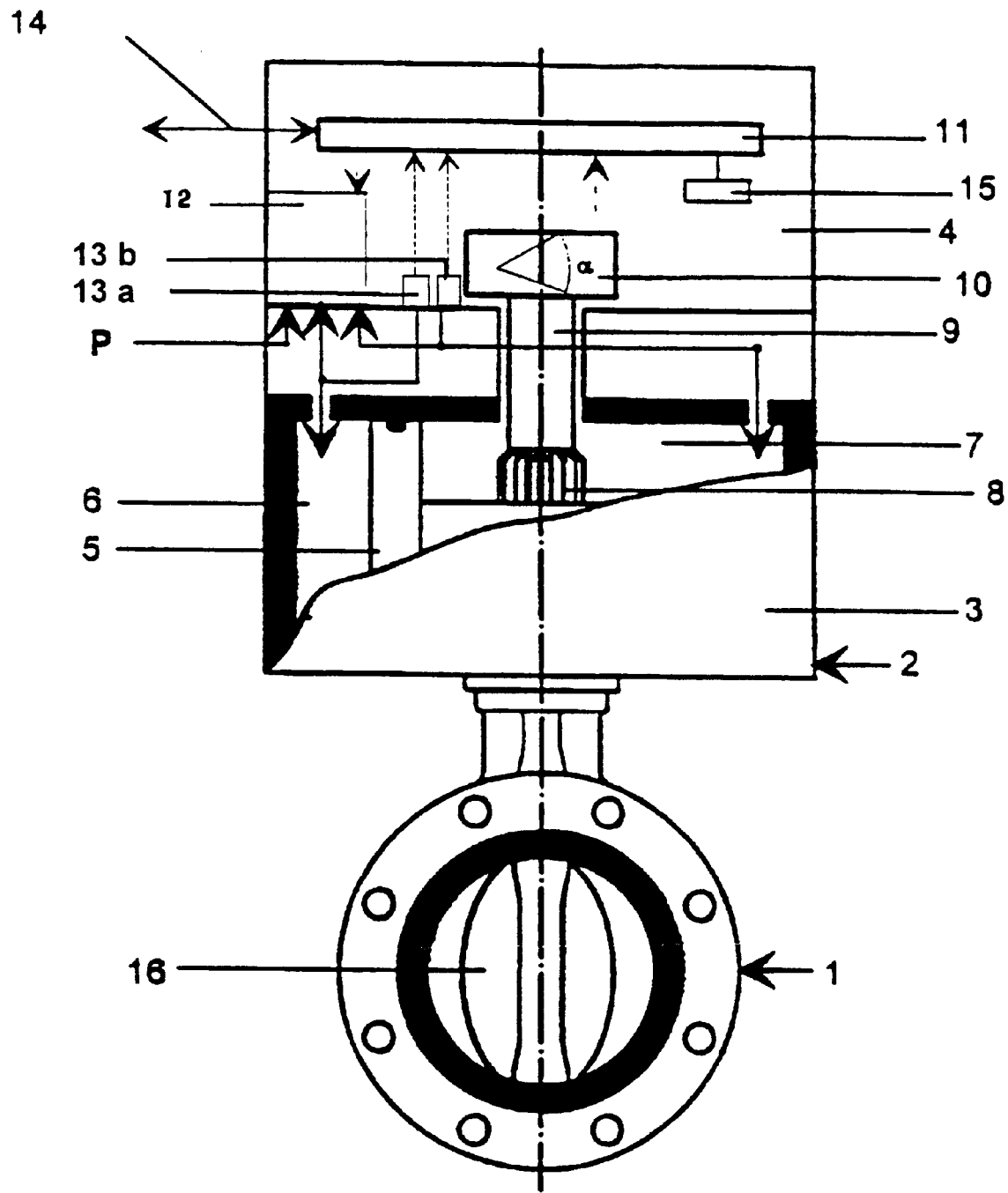
FIG. 1 is a diagram of a pneumatically operated valve.

In FIG. 1, on a valve 1 is mounted an actuator 2 which comprises a first part 3 converting the energy supplied by a source of compressed air (not shown) into mechanical displacement of an obturator of the valve 1, and a second part 4 for monitoring and controlling the actuator 2.

The first part 3 comprises a jack with a rack-type piston 5 which delimits two chambers, one of which, the intake chamber 6, receives the compressed air whilst the other, 7, is connected to atmosphere when the actuator 2 is inoperative. The rack of the piston 5 is in the chamber 7 and meshes with a pinion 8 mounted on a vertical shaft 9, the lower end of which is connected for rotation with a quarter-turn obturator 16 of the valve 1 and the upper end of which is connected to a position sensor 10 located in the monitoring and controlling second part 4.

As a function of the angle α of rotation of the shaft 9, the position sensor 10 supplies an electrical signal indicating the position of the valve 1 to an electronic circuit 11 of the second part 4, via an electrical conductor connecting it to said circuit, and consists, for example, of a resistive potentiometer, an optical sensor, electric contacts or inductive or capacitive proximity detectors. The monitoring and controlling second part 4 further comprises an electromagnetic sluice gate 12 which, as a function of an electrical control signal supplied by the electronic circuit 11 through an electrical conductor, either connects or does not connect a conduit of the actuator communicating with the compressed air source and indicated by the letter P to the intake chamber 6, a device 13 for measuring the pressures prevailing in the chambers 6 and 7 and in the conduit, which supplies electrical pressure measurement signals to the electronic circuit 11 via electrical conductors. The electronic circuit 11 communicates with the outside via a bus 14. The electronic circuit comprises a microprocessor giving out the information, which is connected to an EEPROM memory 15 which stores the information emitted and can be read from outside by means of the electrical circuit 11 and the bus 14.

Figure 2:
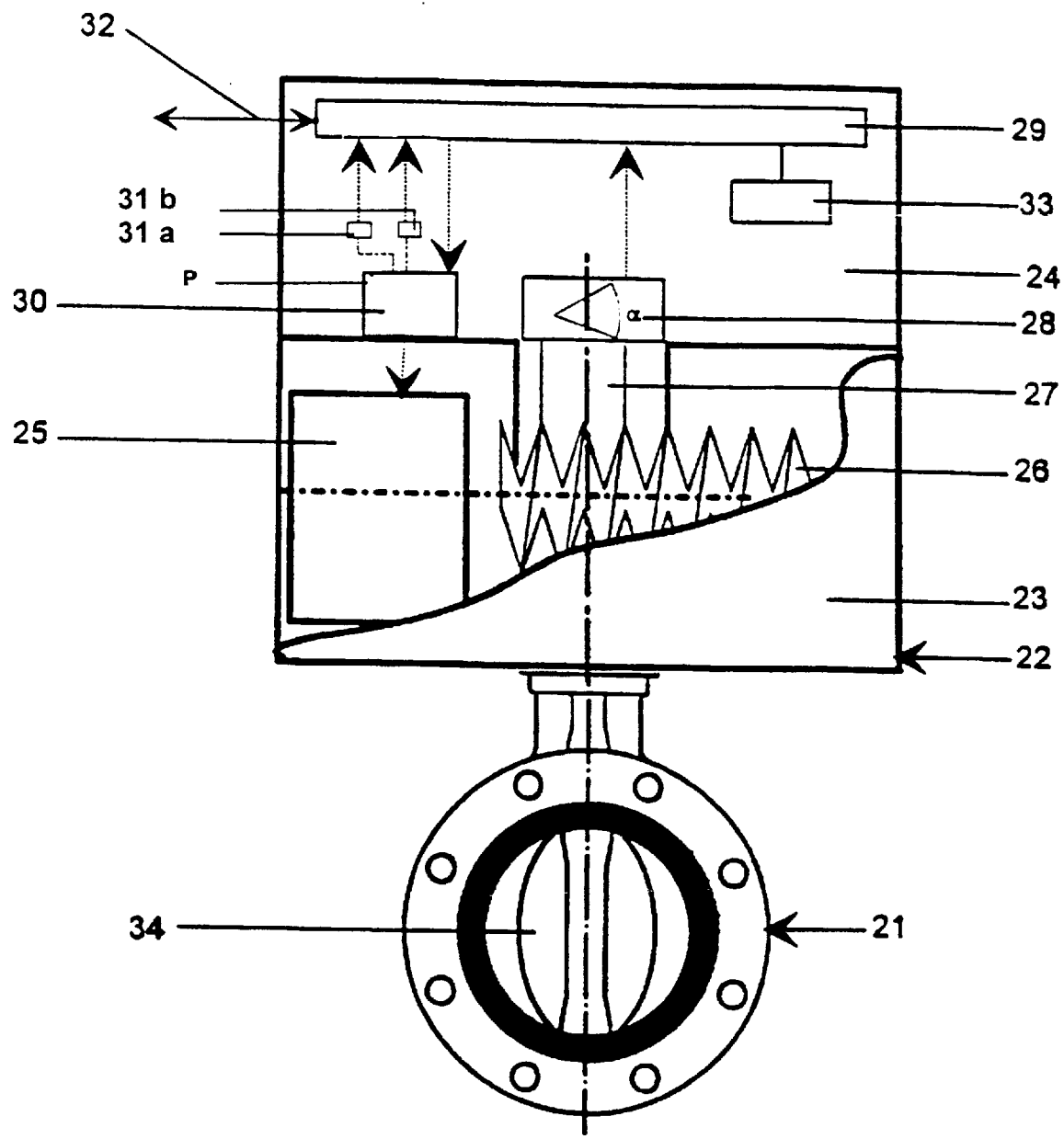
FIG. 2 is a diagram of an electrically operated valve.

The device 13 for measuring the pressures prevailing in the chambers 6 and 7 and the conduit includes a first sensor 13a and a second sensor 13b. The first sensor 13a measures a value representative of the power consumption from the energy source, and the second sensor 13b measures a value representative of the power capable of being supplied to the actuator by the energy source. In FIG. 2, mounted on a valve 21 is an actuator 22 which comprises a first part 23 converting the energy provided by an electrical voltage source (not shown) into mechanical displacement of an obturator of the valve 21, and a second part 24 for monitoring and controlling the actuator 22.

The first part 23 comprises a geared unit 25 which actuates a horizontal screw 26 meshing with a vertical shaft 27, the lower end of which is connected for rotation with a quarter-turn obturator 34 of the valve 21 and the upper end of which is connected to a position sensor 28 located in the monitoring and controlling second part 24.

As a function of the angle of rotation of the shaft 27, the position sensor 28 supplies an electrical signal indicating the position of the valve 21 to an electronic circuit 29 of the second part 24, via an electrical conductor connecting it to said circuit. The monitoring and controlling second part 24 further comprises an electric relay 30 which, as a function of a control signal supplied by the electronic circuit 29 via an electrical conductor, either supplies or does not supply the geared unit 25 with electricity from the voltage source. In the second part 24 of the actuator is provided a device 31 for measuring the current and voltage supplied by the voltage and current inlet of the actuator, connected to the voltage source and indicated by the letter P. The measuring device 31 supplies an electrical current measurement signal and an electrical is voltage measurement signal, via electrical conductors, to the electronic circuit 29. The electronic circuit 29 communicates with the outside via a bus 32. The electronic circuit comprises a microprocessor emitting the information, which is connected to an EEPROM memory 33 which stores the information emitted and can be read from outside by means of the electrical circuit 29 and the bus 32.

The device 31 for measuring the current and voltage supplied by the voltage and current inlet of the actuator includes a first sensor 31a and a second sensor 31b. When the valve is not being operated, as indicated to the electronic circuit 11 or 29 by the position sensor 10 or 28, the electronic circuit 11 or 29 takes account, in the pneumatic actuator 2 shown in FIG. 1, of the measuring signal for the pressure prevailing in the conduit connected to the source of compressed air, supplied by the measuring device 13, or, in the electrical actuator 22 according to FIG. 2, of the measuring signal for the voltage, supplied by the measuring device 31. The electronic circuit 11 or 29 compares the value of the pressure or voltage with a set pressure or voltage value, which may be fed in from outside, through the bus 14 or 32, to the electronic circuit 11 or 29 or stored in the memory 15 or 33. If the comparison indicates that the pressure or voltage value is greater than or equal to the set value, the electronic circuit 11 or 29 emits a first signal via the bus 14 or 32, indicating that the actuator is receiving sufficient energy from the source of compressed air or voltage. In the opposite case, the electronic circuit 11 or 29 emits a first alarm signal via the bus 14 or 32 indicating the inability of the pneumatic or electrical actuator to operate the valve correctly, as a result of an inadequate supply of energy from the source.

When the valve is operated, this is indicated to the electronic circuit 11 or 29 by the position detector 10 or 29, the electronic circuit actuates the electromagnetic sluice gate 12, in the pneumatic actuator 2 according to FIG. 1, and takes account of the measuring signals for the pressures prevailing in the chambers 6 and 7 as supplied by the measuring device 13 in order to obtain an absolute value for the pressure difference and, in the electrical actuator 22 according to FIG. 2, the electronic circuit 29 actuates the relay 30 and takes account of the voltage measuring signal and the current measuring signal supplied by the measuring device 31 to form a value for the product of voltage/current. The absolute value for the pressure difference and the value of the voltage/current product each represent a value for the power absorbed by the operation of the valve.

The electronic circuit 11 or 29 compares this power value with a first set value which may be fed in from outside by means of the bus 14 or 32 or stored in the memory 15 or 33. If the comparison indicates that the power value is greater than the first reference value, the electronic circuit 11 or 29 emits a second alarm signal to the bus 14 or 32, indicating that there is an obstacle impeding the operation of the valve or that the operating force is excessive.

The electronic circuit 11 or 29 also compares the power value with a second reference value, lower than the first, which may itself be prescribed from outside using the bus 14 or 32 or stored in the memory 15 or 33. If the comparison indicates that the power value is less than the second reference value, the electronic circuit 11 or 29 emits a signal via the bus 14 or 32 indicating that the valve 1 or 21 is excessively worn. If the comparison indicates that the power value is between the first and second reference values, the electronic circuit 11 or 29 emits a signal, through the bus 14 or 32, indicating that the valve is being safely operated. It is also possible to arrange it so that in this case the electronic circuit 11 or 29 does not give any indication.

What is claimed is:

1. A valve apparatus coupled to an energy source, comprising:

a valve operable between an open and a closed position;

an actuator connected to the valve and operating the valve between the open and closed positions;

a detector positioned within the actuator to determine if the actuator is in operation;

a first sensor positioned within the actuator and configured to measure a value representative of an absorbed power during operation of the valve; and an electronic circuit connected to the first sensor and to the detector, the circuit configured to compare the value representative of the absorbed power with a reference value and to generate a signal indicative of a difference between the reference value and the value representative of the absorbed power during operation of the valve.

2. The valve apparatus of claim 1, wherein the energy source supplies a pressurized fluid, the actuator comprises a pneumatic jack piston and the first sensor measures a fluid pressure at either end of the pneumatic jack piston.

3. The valve apparatus of claim 1, wherein the reference value is a first value which an actual power consumed coming from the energy source must not exceed.

4. The valve apparatus of claim 1, wherein the reference value is a second value below which an actual power consumed coming from the energy source must not fall.

5. The valve apparatus of claim 1, wherein the actuator has a memory adapted to store the signal generated by the electronic circuit, the reference value, and set values.

6. The valve apparatus of claim 1, wherein the energy source supplies electric current, the actuator is an electromechanical transducer and the first sensor measures electric power consumed during operation of the valve.

7. The valve apparatus of claim 1, further comprising a second sensor to measure a value representative of a power capable of being supplied to the actuator by the energy source, the electronic circuit being connected to the second sensor and to the detector to compare the value representative of the power capable of being supplied to the actuator by the energy source with a second reference value while the actuator is not operating the valve and to generate a signal indicative of a difference between the second reference value and the value representative of the power capable of being supplied to the actuator by the energy source.

8. The valve apparatus of claim 7, wherein the energy source supplies a pressurized fluid, the actuator comprises a pneumatic jack piston and the first sensor measures a fluid pressure at either end of the pneumatic jack piston.

9. The valve apparatus of claim 8, where the second sensor measures the fluid pressure at the actuator upstream of the pneumatic jack piston.

10. The valve apparatus of claim 7, wherein the second reference value is a value below which an actual value representing of the power capable of being supplied to the actuator by the energy source must not fall.

11. The valve apparatus of claim 7, wherein the actuator has a memory adapted to store information provided by the electronic circuit and the reference and set values.

12. The valve apparatus of claim 7, wherein the energy source supplies electric current, the actuator is an electromechanical transducer and the first sensor measures electric power provided by the energy source during operation of the valve.

13. The valve apparatus of claim 12, wherein the second sensor measures the electric current applied to the actuator by the energy source.

* * * * *